(12) United States Patent
De Vaan

(10) Patent No.: US 6,762,870 B2
(45) Date of Patent: *Jul. 13, 2004

(54) PROJECTION DISPLAY DEVICE

(75) Inventor: Adrianus Johannes Stephanes Maria De Vaan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 2 days.

This patent is subject to a terminal disclaimer.

(21) Appl. No.: 10/151,046

(22) Filed: May 20, 2002

(65) Prior Publication Data

US 2002/0176146 A1 Nov. 28, 2002

(30) Foreign Application Priority Data

May 22, 2001 (EP) .............................................. 01201927

(51) Int. Cl.[7] .............................. G02F 1/03; G02F 1/07
(52) U.S. Cl. ....................................... 359/242; 349/115
(58) Field of Search .......................... 359/242; 349/106, 349/115; 353/31, 84

(56) References Cited

U.S. PATENT DOCUMENTS 6,005,722 A * 12/1999 Butterworth et al. ....... 359/712

* cited by examiner

Primary Examiner—Scott J. Sugarman
Assistant Examiner—Richard Hanig

(57) ABSTRACT

The invention relates to a projection display device comprising an illumination system having a light source and an optical guiding means for providing an illumination beam, an image display system comprising a display panel for modulating the illumination beam with image information and projecting the image on a screen, and color filter means provided on a wheel, rotatably mounted at its hub, for transmitting colored portions of the illumination beam for illuminating the display panel. In order to simplify the manufacture of the projection display device, the color filter wheel is provided with one or more cholesteric layers for reflecting a portion of the illumination beam not having a predetermined color and having a circular polarization corresponding to a first direction.

10 Claims, 4 Drawing Sheets

PROJECTION DISPLAY DEVICE

Figure 1:
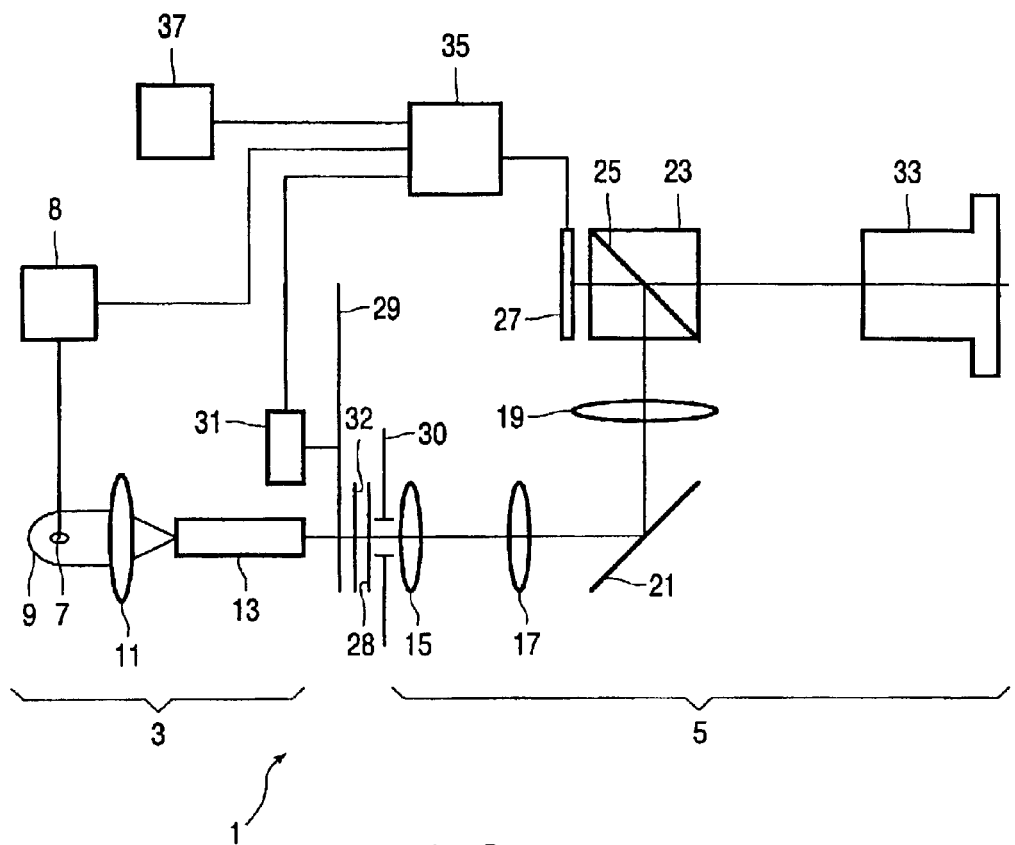

The invention relates to a projection display device comprising an illumination system having a light source and an optical guiding means for providing an illumination beam, color filter means comprising a color filter wheel for scanning the display panel with different colored portions of the illumination beam, and an image display system having an image display panel for modulating the colored portions of the illumination beam with image information and projecting an image on a screen.

The invention also relates to a color filter wheel for use in such a projection display device.

Projection display devices can be used in both rear and front image projection systems. In a rear projection system, the projection display device projects an image representing television or datagraphic information on the rear side of a diffusing transparent screen, which front side is directed to a viewing audience. In a front projection system, the projection display device projects an image representing television or datagraphic information on the front side of a reflecting screen, which front side is directed to a viewing audience.

Such a projection display device is known from U.S. Pat. No. 6,005,722. The known projection system comprises an illumination system and an image display system having an image display panel for modulating an illumination beam to be supplied by the illumination system with image information. The illumination system comprises a light source and an integrator system for forming an illumination beam. A color wheel is present between the light source and the integrator system. The color wheel includes red, green and blue filters. The color filters occupy angular segments of the color wheel. The color wheel filters the white light from the illumination system to produce a colored illumination beam that changes colors from red to green, from green to blue and from blue to red and so on in a rate proportional to the angular speed of the wheel. The display panel modulates the colored illumination beam in accordance with corresponding image information of the color of the illumination beam incident on the display panel. In order to improve the light efficiency, a reflective polarizer may be present between the color filter wheel and the display system. The reflective polarizer transmits a portion of the illumination beam having a polarization in a first direction and reflects a portion of the illumination beam having a second polarization in a second direction, perpendicular to the first direction. Furthermore, light recycling means may be present in the projection display device to reuse the reflected light from the reflective polarizer. A dichroic filter can also be used in the color filter wheel for reflecting a portion of the illumination beam having an undesired color.

The known projection display device has the drawback that the known color wheel with dichroic filters is difficult to manufacture.

It is an object of the invention to provide a projection display device and a color filter wheel which can be easily manufactured. This object can be achieved by the projection display device in accordance with the invention, and is characterized in that the color filter wheel comprises a cholesteric layer for reflecting a portion of the illumination beam not having a predetermined color and having a circular polarization corresponding to a first direction. The application of dichroic type color filters comprising cholesteric layers simplifies the manufacture of color wheels with, for example, spiral-shaped color filter portions. The invention is based on the recognition that the spectral properties of a cholesteric filter are dependent on the illumination conditions at different locations on the substrate during polymerization. By illuminating a liquid crystal on a transparent substrate with different light conditions in predetermined filter portions, and photopolymerisation of the different filter portions in a predetermined order and under predetermined light conditions, a dichroic filter pattern can be created. The direction of rotation of a helix of the cholesteric molecules forming the cholesteric layer and the pitch of the molecular helix of the cholesteric material determines a color or passband and a circular polarization direction of a transmitted portion of the illumination beam. Cholesteric color filters are known per se from the published international application WO 00/34808. In this application, a method of manufacturing a cholesteric mosaic color filter for direct-view liquid crystal displays is described. However, the filter portions in this mosaic color filter have dimensions of the order of several 100 micrometers.

A particularly advantageous embodiment of the projection device according to the invention is characterized in that the projection display device further comprises a wideband cholesteric layer positioned between the cholesteric layer and the display panel for reflecting of a portion of the incident illumination beam having a circular polarization corresponding to a second direction, opposite to the first direction. With this arrangement of color filter and polarizer, only the portion of the illumination beam having the predetermined color and predetermined circular polarization is transmitted to the display panel.

A further embodiment of the projection display device according to the invention is characterized in that the wideband cholesteric layer is provided on the color filter wheel. This arrangement allows simple manufacture of all cholesteric layers on a single substrate.

A further embodiment of the projection display device according to the invention is characterized in that the projection display device comprises a quarter-wave plate positioned between the color filter means and the display panel for converting the circularly polarized transmitted illumination beam into a linearly polarized illumination beam.

Cholesteric color filters transmit only a portion of the illumination beam having a circular polarization. Modulation of the illumination beam by a liquid crystal display may require an illumination beam having a linear polarization. Furthermore, the projection display device may be provided with a transmissive liquid crystal display panel or a reflective liquid crystal display panel.

Another embodiment of the projection display device according to the invention is characterized in that the color filter wheel is provided with a further cholesteric layer positioned between the cholesteric layer and the display panel on the color filter wheel, the rotation of the helix of the cholesteric molecules forming the further cholesteric layer, corresponding to a second direction opposite to the first direction for reflecting a portion of the incident illumination beam not having a predetermined color and having a second circular polarization corresponding to the second direction. This arrangement of cholesteric layers transmits only a portion of the illumination beam having a predetermined color.

A further embodiment of the display device according to the invention is characterized in that the image display panel comprises a digital micro-mirrored display panel.

These and other aspects of the invention are apparent from and will be elucidated with reference to the embodiments described hereinafter.

Figure 2:
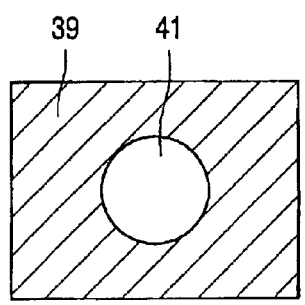
Figure 3:
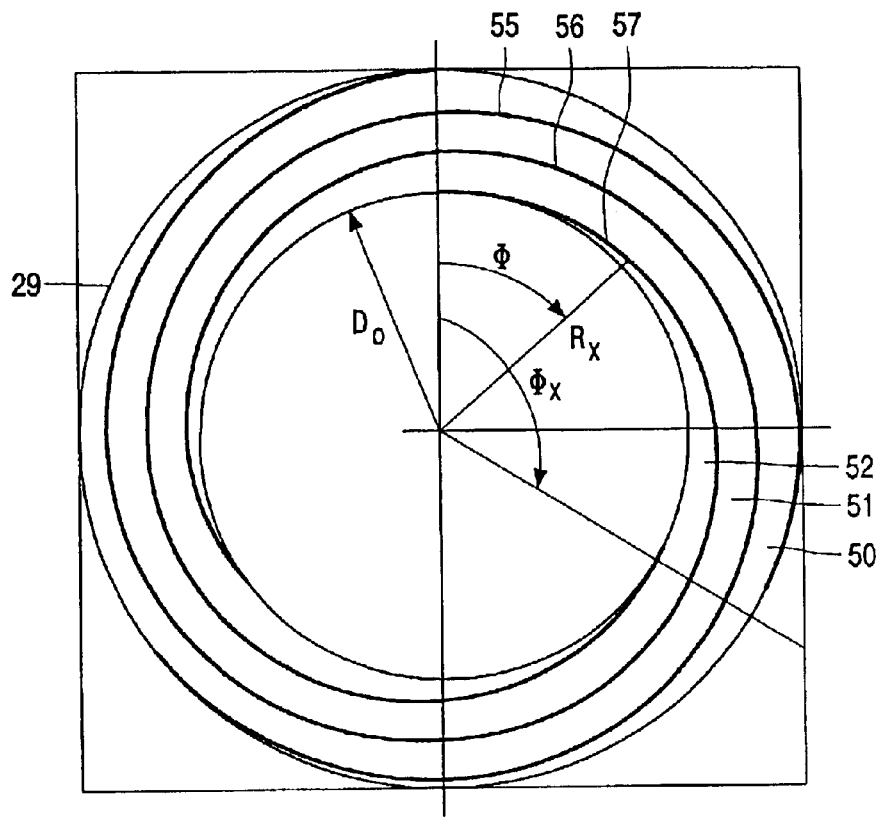
Figure 4:
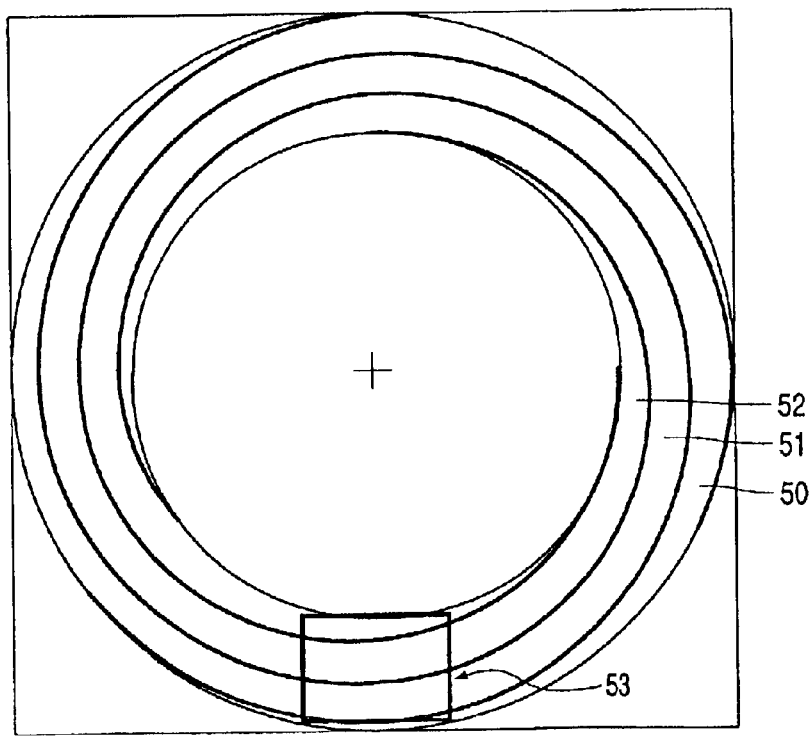
Figure 5:
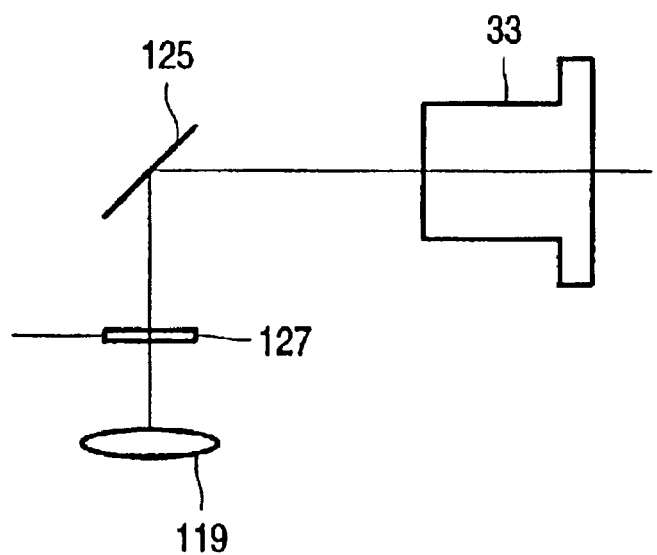
Figure 6:
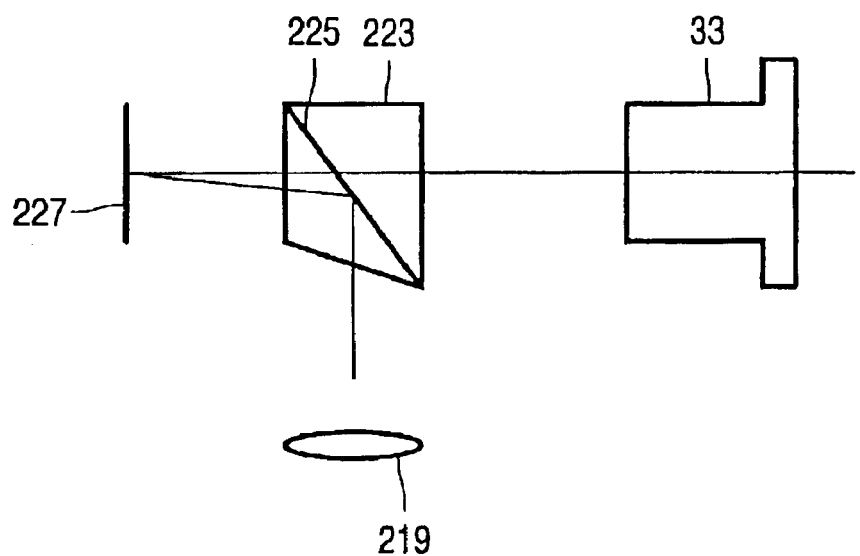
Figure 7:
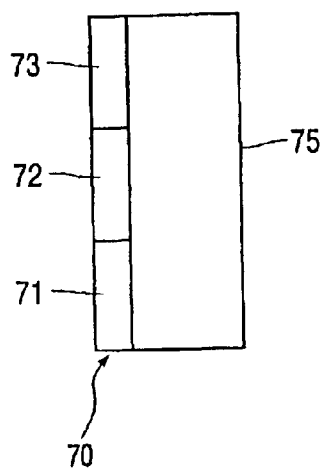
Figure 8:
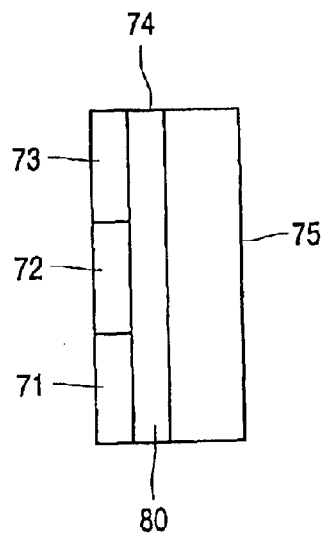
Figure 9:
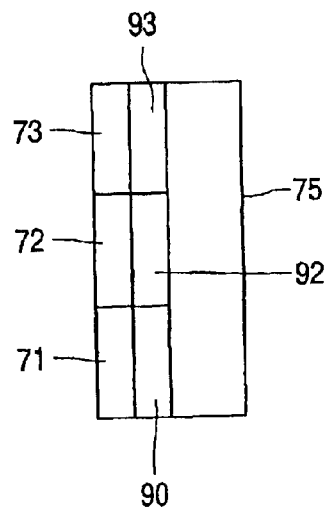

In the drawings:

FIG. 1 shows an example of a projection display device having a reflective liquid crystal display panel and color filter means, FIG. 2 shows an entrance surface of an optically transparent bar, FIG. 3 shows a color filter wheel for use in the first arrangement having three geometrically identical filter portions for transmitting red, green and blue light, respectively, FIG. 4 shows a color filter having spiral-shaped portion in combination with a window for providing an illumination beam with three colored portions simultaneously scanning the display panel, FIG. 5 shows a relevant portion of the projection display device comprising a transmissive liquid crystal display panel, FIG. 6 shows a relevant portion of the projection display device comprising a digital micro-mirrored display panel, FIG. 7 shows a first example of a color filter wheel having a single cholesteric layer for use in a projection display device comprising a transmissive or a reflective liquid crystal display device, FIG. 8 shows a second example of a color filter wheel having a cholesteric layer and a wideband cholesteric layer for use in a projection display device comprising a transmissive or a reflective liquid crystal display device, and FIG. 9 shows a third example of a color filter wheel having two cholesteric layers for use in a projection display device comprising a digital mirrored device.

FIG. 1 shows an example of a first image projection system 1 comprising an illumination system 3 for supplying an illumination beam and an image display system 5 for modulating the illumination beam. The illumination system 3 comprises a light source 7, a reflector 9, a condenser lens 11 and a light-guiding means 13, for example, a bar of optically transparent material. The light source is electrically coupled to a control unit 8. The reflector ensures that the greater part of the light emitted by the light source 7 in a direction away from the illumination system as yet reaches the image display system 5. The illumination beam generated by the illumination system 3 is incident on the image display system 5. The image display system 5 comprises a reflective display panel 27, a polarising beam-splitting (PBS) prism 23, relay lenses 15,17,19, a mirror 21 and a projection lens 33. The first projection device 1 also comprises control means 35 and a color filter wheel 29 coupled to an electric motor drive 31. The color filter wheel 29 is positioned between the exit window of the optical bar 13 and the image display system 5. A rectangular window 30 is positioned between the color filter wheel 29 and the image display system 5 for providing, in combination with a spiral-shaped color filter pattern on the color wheel 29, a rectangular colored scanning illumination beam on the reflective display panel 27. Furthermore, the projection device 1 comprises a reflective polarizer, for example, a wired grid polariser 18 as can be ordered from Moxtek. The reflective display panel 27 is, for example, a reflective liquid crystal on silicon (LCOS) display panel.

In operation, light from the light source 7 and the reflector 9 is coupled into the optical bar 13 via a lens 11 and an entrance surface and coupled out of the optical bar via an exit surface. A front view of the entrance surface of the optical bar is shown in FIG. 2.

FIG. 2 shows an entrance surface of the optical bar 13. The entrance surface is covered with a reflective layer 39 except for an annular opening 41 around the longitudinal axis of the optical bar 13. The ratio between the area of the opening in the reflective layer and the area of the reflective layer is preferably larger than 5:1. This ratio depends, for example, on the arc length of an incandescent light source and can be found experimentally by a skilled person by optimizing the light output of the projection device 1. The optical bar 13 forms an illumination beam at the exit surface. The illumination beam is incident on a dichroic filter portion of the color wheel 29. The arrangement of the rotating spiral-shaped dichroic color filter 29 and the rectangular illumination window 30 provides an illumination beam having red, green and blue portions with a rectangular cross-section in the propagation direction of the illumination beam, simultaneously scanning one or more lines of the display panel 27 so that all the lines are consecutively illuminated by the red, green and blue portions of the illumination beam. The color wheel 29 comprises three filter portions for transmitting red, green and blue light simultaneously. The dichroic filter portion of the color wheel 29 reflects the undesired portion of the illumination beam, not having the proper color, back to the exit surface of the optical bar 13. Inside the optical bar 13, a large portion of this reflected light is reflected by means of the reflective layer 39 at the entrance surface and can be used again. In the first projection device 1, the portion of the illumination beam which does not have the desired characteristics is thus recycled and can be used again for illumination of the LCOS panel 27.

The dichroic filter portion of the color filter wheel 29 transmits the portion of the illumination beam having the predetermined color to the reflective polarizer 28. The reflective polarizer 28 transmits only a portion of the beam having a polarisation directed in a first direction to the PBS prism 23 and reflects a portion of the illumination beam having a polarisation directed in a second direction perpendicular to the first direction via the color filter wheel 29 back towards the optical bar 13. In this arrangement, a portion of the illumination beam not having the desired characteristic is recycled and can then be used again for illumination of the LCOS display 27. In order to improve the recycle efficiency, a quarter-wave plate 32 can be placed between the color wheel 29 and the reflective polarizer 28 to rotate the polarisation of the reflected portion of the illumination beam to the first polarisation direction. The relay lenses 15,17,19 guide the predetermined portion of the illumination beam towards the entrance side of the PBS prism 23. The beam-splitting layer 25 of the PBS prism 23 reflects the portion of the illumination beam having the polarisation in the first direction towards the LCOS panel 27. The LCOS panel 27 reflects the illumination back to the PBS prism 23 and rotates the polarisation direction of the illumination beam in conformity with the image information related to the instant color of the illumination beam. The polarising beam-splitting layer 25 transmits a first portion of the reflected modulated illumination beam towards the projection lens 33 and reflects a second portion of the reflected illumination beam back to the optical bar 13. The light modulated by the image panel 27 is projected on a screen (not shown) by means of a projection lens system represented for the sake of simplicity by a single projection lens 33.

Instead of a reflective liquid crystal display panel, a known transmissive liquid crystal display panel 127 and a folding mirror 125 can be applied in the projection display device. FIG. 5 shows a relevant portion of the projection display device comprising an arrangement of the transmissive liquid crystal display panel 127 and the folding mirror 125 positioned between the relays 119 and the projection lens 33. The transmissive liquid crystal display panel 127 and the folding mirror 125 replaces the reflective LCOS panel 27 and the beam-splitting prism 25 in the projection display device as shown in FIG. 1. In operation, the arrangement of the rotating spiral-shaped dichroic color filter 29 and the rectangular illumination window 30 provides an illumination beam having red, green and blue portions with a rectangular cross-section in the propagation direction of the illumination beam, simultaneously scanning one or more lines of the display panel 27 so that all the lines are consecutively illuminated by the red, green and blue portions of the illumination beam. The portions of the illumination beam incident simultaneously on the transmissive liquid crystal display panel are modulated in conformity with image information. The modulated portions of the illumination beam are projected on a screen (not shown) by the projection lens 33.

Alternatively, instead of a reflective display panel and a prism 25, a known digital micromirror display (DMD) panel and a total internal reflection (TIR) prism can be used. FIG. 6 shows a relevant portion of the projection display device comprising a DMD display panel 227 and a TIR prism 225 positioned between the relays 119 and the projection lens. The DMD display panel 227 and the TIR prism 225 replace the reflective liquid crystal display device 27 and the prism 25 in the projection display device as shown in FIG. 1. In operation, the portions of the illumination beam incident simultaneously on the DMD panel are deflected in conformity with image information. The deflected portions of the illumination beam are projected on a screen (not shown) by the projection lens 33.

FIGS. 3 and 4 show possible filter patterns for use in the color filter wheel. In this color filter wheel, each color filter occupies a spiral-shaped portion of the circular filter wheel. The intersection between different color filters can be described by the formula $$Rx = D0 + \alpha(\phi + \phi X) \quad (1)$$

wherein

Rx represents a distance between the intersection between two color filters and the hub of the color filter wheel, D0 represents a distance between a side of the illumination window nearest to the hub and the hub of the color filter wheel, α represents a predetermined constant angle, φ represents the rotating angle of the color filter wheel, and φX represents the phase of the intersection.

FIG. 3 shows a first example of a color filter wheel 29 having dichroic color filters 50,51,52 for transmitting red, green and blue light. The three spiral-shaped portions of the color filter wheel are identical for each color. The intersections 55,56,57 of the filter portions 50,51,52 can be found by applying formula (1) and setting the phase for each intersection at 0°, 120° and 240°. FIG. 4 shows a color filter wheel 29 in combination with a rectangular illumination window 53. In operation, the arrangement of the rotating spiral-shaped dichroic color filter portions 50,51,52 and the rectangular illumination window 30 provides an illumination beam having red, green and blue portions with a rectangular cross-section in the propagation direction of the illumination beam, simultaneously scanning one or more lines of the display panel 27 so that all the lines are consecutively illuminated by the red, green and blue portions of the illumination beam.

In order to provide a color filter wheel which can be easily manufactured, the dichroic filters consist of cholesteric layers. This is advantageous because the use of cholesteric color filters allows a relatively cheap method of manufacturing the color filter wheel. Cholesteric filters are known per se from the cited WO 00/34808. This application discloses a method of manufacturing patterned color filters. The method comprises the steps of a) providing a layer of a cholesterically ordered material comprising a quantity of a convertible compound which in its non-converted and in its converted state determines the pitch of the cholesterically ordered material to a different extent, in which the conversion of said compound may be induced by radiation, b) irradiating the layer in accordance with a predetermined spiral pattern so that at least a part of the convertible compound in the irradiated parts of the layer is converted, c) polymerizing and/or crosslinking the cholesterically ordered material to form a three-dimensional polymer. The convertible compound preferably comprises an isomerizable, chiral compound. Polymerization and/or crosslinking are preferably induced by irradiation using electron-beam radiation or actinic radiation.

FIG. 7 is a cross-section of a first example of a spiral-shaped filter wheel for use in a projection display device using a liquid crystal display. The cross-section 70 shows equal red, green and blue filter portions 71,72,73 for transmitting red, green and blue light. Each filter portion comprises one or more cholesteric layers. The cholesteric layers are provided on a substrate 75. The direction of the helix of the molecules forming the cholesteric layer of the red and blue filter portions 71,73 corresponds to a dextrorotatory direction and the pitch of the molecular helix of the cholesteric material is adjusted for transmitting unpolarized red and blue portions of the illumination beam, respectively, together with levorotatory polarized blue and red portions of the illumination beam, respectively. The green filter portion comprises a first cholesteric layer and a second cholesteric layer. The second cholesteric layer is provided between the first cholesteric layer and the substrate 75. The direction of the helix of the molecules forming the first cholesteric layer of the green filter portions 72 corresponds to a dextrorotatory direction and the pitch of the molecular helix of the cholesteric material is adjusted for reflecting a red portion of the illumination beam. The direction of the molecular helix forming the second cholesteric layer of the green filter portions 72 corresponds to a dextrorotatory direction and the pitch of the molecular helix is adjusted for reflecting a blue portion of the illumination beam. Both cholesteric layers then transmit a green portion of the illumination beam. This color filter wheel 29 can be combined with a reflective wideband cholesteric layer provided on a second substrate arranged between the color wheel 29 and the liquid crystal display panel 25. The direction of the helix of the molecules of the wideband cholesteric layer 74 corresponds to a levorotatory direction for reflecting the portion of the incident illumination beam having a levorotatory polarization. It is also possible to provide the wideband cholesteric layer 74 on the same substrate 75. This is shown in FIG. 8.

FIG. 8 is a cross-section of a second example of a color filter wheel for use in a projection display device using a liquid crystal display panel. During manufacture, the wideband cholesteric layer 74 is first provided on the substrate 75, then the red, green and red filter portions 71,72,73 comprising the cholesteric layers are provided on the wideband cholesteric layer 74. The wideband cholesteric layer 74 transmits a dextrorotatory polarized red, green or blue portion of the incident illumination beam, respectively, and reflects the levorotatory polarized portion of the incident illumination beam. Manufacture of the cholesteric layers and the wideband cholesteric layer is known per se from the cited WO 00/34808.

In order to obtain a linear polarization of the colored illumination beam, a quarter-wave plate is arranged between the color filter wheel 29 and the liquid crystal display panel. 27,127.

FIG. 9 is a cross-section of a third example of a spiral-shaped filter wheel for use in a projection display device using a reflective DMD display panel. The cross-section shows first red, green and blue filter portions 71,72,73 for transmitting red, green and blue. The first red, green and blue filter portions 71,72,73 are identical to those described with reference to FIGS. 7 and 8. The cross-section also shows second red, green and blue filter portions 90, 92, 93 arranged between the first filter portions 71,72,73 and the substrate 75. The cholesteric layers of the second red and blue filter portions 90, 93, respectively, have a levorotatory direction of the molecular helix, and the pitch of the molecular helix of cholesteric layer of the second red and blue filter portions 90, 93 is adjusted to transmit an unpolarized red or blue portion of the incident illumination beam, respectively, and to reflect the leverotatory polarized green and blue portions and red and green portions of the illumination beam, respectively. The second green filter portion 92 comprises a first cholesteric layer and a second cholesteric layer. The second cholesteric layer is provided between the first cholesteric layer and the substrate 75. The direction of the helix of the molecules forming the first cholesteric layer of the green filter portions 92 corresponds to a levorotatoty direction and the pitch of the molecular helix of the cholesteric material is adjusted to reflect a red portion of the illumination beam. The direction of the molecular helix forming the second cholesteric layer of the green filter portions 92 corresponds to a levorotatory direction and the pitch of the molecular helix is adjusted to reflect a blue portion of the illumination beam having a levorotatory polarization. Both cholesteric layers of the second green filter portion 92 then transmit a green portion of the illumination beam. Manufacture of the first layer and the second cholesteric layers is known par se from the cited WO 00134808.

What is claimed is:

1. A projection display device comprising an illumination system having a light source and an optical guiding means for providing an illumination beam, color filter means comprising a color filter wheel for simultaneously scanning the display panel with different colored portions of the illumination beam, and an image display system having an image display panel for modulating the colored portions of the illumination beam with image information and projecting an image on a screen, characterized in that the color filter wheel comprises a cholesteric layer for reflecting a portion of the illumination beam not having a predetermined color and having a circular polarization corresponding to a first direction.

2. A projection display device as claimed in claim 1, characterized in that the projection display device further comprises a wideband cholesteric layer positioned between the cholesteric layer and the display panel for reflecting a portion of the incident illumination beam having a circular polarization corresponding to a second direction, opposite to the first direction.

3. A projection display device as claimed in claim 2, characterized in that the wideband cholesteric layer is provided on the color filter wheel.

4. A projection display device as claimed in claim 2, characterized in that the projection device comprises a quarter-wave plate positioned between the wideband cholesteric layer and the display panel for converting the circularly polarized transmitted illumination beam into a linearly polarized illumination beam.

5. A projection display device as claimed in claim 4, characterized in that the image display panel comprises a transmissive liquid crystal display panel.

6. A projection display device as claimed in claim 4, characterized in that the image display panel comprises a reflective liquid crystal display panel.

7. A projection display device as claimed in claim 1, characterized in that the color filter wheel is provided with a second cholesteric layer positioned between the first cholesteric layer and the display panel for reflecting a portion of the incident illumination beam not having a predetermined color and having a second circular polarization corresponding to the second direction.

8. A projection display device as claimed in claim 1, characterized in that the image display panel comprises a digital micro-mirrored display panel.

9. A projection display device as claimed in claim 1, characterized in that the color filter wheel comprises three respective color filter portions for simultaneously transmitting red, green, and blue portions of the illumination beam.

10. A color filter wheel for use in a projection display device as claimed in claim 1.

* * * * *